United States Patent Office.

FREDERICK BIHN AND WILLIAM SCHRADER, OF FRANKFORD, PENNSYLVANIA.

Letters Patent No. 84,934, dated December 15, 1868.

IMPROVED MODE OF RECOVERING USEFUL PRODUCTS FROM THE WASTE LIQUOR OF GELATINE-FACTORIES.

The Schedule referred to in these Letters Patent and making part of the same.

*To all whom it may concern:*

Be it known that we, FREDERICK BIHN and WILLIAM SCHRADER, of Frankford, in the county of Philadelphia, and State of Pennsylvania, have invented a new and improved Treatment of Waste Liquor Produced in the Manufacture of Gelatine by muriatic acid; and we do hereby declare that the following is a full, clear, and exact description thereof, which will enable others skilled in the art to understand the same.

The object of this invention is to separate the ingredients of the waste liquor, which is produced in those glue-factories in which gelatine is made by treating certain bones with diluted muriatic acid.

This process of making gelatine is well known, and need not here be described.

Heretofore the waste liquor, which is composed of dissolved phosphate of lime, carbonate of lime, and a very small portion of animal matter, has generally been considered useless, and thrown away, only a few unsuccessful attempts having been made to utilize it.

Our process consists in separating the ingredients by the evaporation and subsequent condensation of the muriatic acid, whereby the phosphate of lime remains as a residuum.

The invention also consists in treating the waste liquor with sulphuric acid for the purpose of aiding and facilitating the aforesaid evaporating-process.

The following is a description of our process:

The waste liquor is, in an open pan, first boiled down to about one-half its volume, whereby the surplus water used for diluting the muriatic acid is evaporated. It is then put into retorts and heated sufficiently to evaporate the muriatic acid, which is conducted to a condensing-vessel to be condensed. The muriatic acid thus regained is sufficiently pure to allow its being used over again in the production of gelatine by the aforesaid process, or for other suitable purposes.

In the retort will remain phosphate of lime and a very small trace of muriate of lime, the latter having been produced by the combination of muriatic-acid with carbonate of lime.

This phosphate of lime can be used for fertilizing and other suitable purposes for which the same is now used.

The aforesaid process requires a considerable degree of heat in order to separate the muriatic acid in the retort. By adding sulphuric acid to the liquor in the retort, the muriatic acid will be separated from the lime, and a less degree of heat will be required to distill it.

The application of two equivalents of sulphuric acid will produce two equivalents of sulphate of lime and one equivalent of soluble superphosphate of lime, leaving the muriatic acid free to be expelled.

These residua can also be used for fertilizing and other purposes.

The sulphuric acid need not be applied in its pure state, but may be used in any bound state, where it occurs in excess, as, for example, in the well-known salt-cakes, (bisulphate of soda,) which remain in the manufacture of muriatic acid, by combining salt with sulphuric acid.

From the above, it will be understood that our invention consists in separating the ingredients of the aforesaid waste liquor either by distillation alone, or by the combined action of sulphuric acid and distillation.

Having thus described our invention,

We claim as new, and desire to secure by Letters Patent—

The process herein described of separating the ingredients of the herein-specified waste liquor, for the purpose of utilizing the same, as set forth.

The above specification of our invention signed by us, this 3d day of November, 1868.

FREDERICK BIHN.
WILLIAM SCHRADER.

Witnesses:
THOS. T. HOLME,
W. D. SHUSTER.